(12) United States Patent
Miller

(10) Patent No.: US 10,413,062 B2
(45) Date of Patent: Sep. 17, 2019

(54) EXTENDED QUARTERS

(71) Applicant: Garry Marc Miller, Los Angeles, CA (US)

(72) Inventor: Garry Marc Miller, Los Angeles, CA (US)

(*) Notice: Subject to any disclaimer, the term of this patent is extended or adjusted under 35 U.S.C. 154(b) by 0 days.

(21) Appl. No.: 15/836,764

(22) Filed: Dec. 8, 2017

(65) Prior Publication Data

US 2018/0199711 A1 Jul. 19, 2018

Related U.S. Application Data

(60) Provisional application No. 62/498,072, filed on Dec. 14, 2016.

(51) Int. Cl.
| | |
|---|---|
| *A47B 53/00* | (2006.01) |
| *A47B 83/00* | (2006.01) |
| *A47B 57/00* | (2006.01) |
| *A47B 87/00* | (2006.01) |
| *A47B 88/40* | (2017.01) |
| *F24C 7/00* | (2006.01) |
| *A47C 19/22* | (2006.01) |
| *A47B 9/00* | (2006.01) |
| *E04F 11/02* | (2006.01) |
| *A47B 83/04* | (2006.01) |

(52) U.S. Cl.
CPC .............. *A47B 83/00* (2013.01); *A47B 9/00* (2013.01); *A47B 57/00* (2013.01); *A47B 83/045* (2013.01); *A47B 87/00* (2013.01); *A47B 88/40* (2017.01); *A47C 19/22* (2013.01); *E04F 11/02* (2013.01); *F24C 7/00* (2013.01); *F24C 7/004* (2013.01)

(58) Field of Classification Search
CPC ........................................ A47B 53/02
USPC .............................. 312/201; 5/2.1
See application file for complete search history.

(56) References Cited

U.S. PATENT DOCUMENTS

| | | | | |
|---|---|---|---|---|
| 3,633,224 | A * | 1/1972 | Millier ............ | A47C 17/32 5/18.1 |
| 4,110,854 | A * | 9/1978 | Sjolie ............ | A47C 17/86 5/2.1 |
| 4,450,597 | A * | 5/1984 | Hull .............. | A47C 19/20 5/2.1 |
| 4,861,122 | A * | 8/1989 | Newhouse ....... | A47B 67/04 312/330.1 |
| 5,713,650 | A * | 2/1998 | King ............. | A47B 81/00 312/265.4 |
| 6,402,271 | B1 * | 6/2002 | Kelley ........... | A47B 21/00 312/196 |
| D484,328 | S * | 12/2003 | Heron ............. | 5/2.1 |
| 6,675,408 | B1 * | 1/2004 | Mason ............ | A47D 7/00 5/2.1 |
| 6,721,969 | B1 * | 4/2004 | Lupo ............. | A47C 17/86 5/9.1 |
| 7,181,784 | B1 * | 2/2007 | Geilear ........... | A47C 19/022 5/2.1 |

(Continued)

*Primary Examiner* — Matthew W Ing
(74) *Attorney, Agent, or Firm* — Fish & Richardson P.C.

(57) ABSTRACT

In some implementations, a modular furniture cabinet includes a top flooring affixed to static furniture and supported by one or more structures. The top surface of a bottom flooring, backs of the static furniture pieces, and a bottom surface of the top flooring define a storage space, and the dynamic furniture pieces substantially reside in the storage space when the modular furniture cabinet is in a closed configuration.

6 Claims, 3 Drawing Sheets

(56) References Cited

U.S. PATENT DOCUMENTS

| | | | |
|---|---|---|---|
| 7,971,290 B2* | 7/2011 | Woodhams | A47C 19/20 5/2.1 |
| 2007/0214567 A1* | 9/2007 | Wandel | A47B 83/04 5/3 |
| 2014/0196208 A1* | 7/2014 | Copeland | A47C 17/22 5/14 |

* cited by examiner

EXTENDED QUARTERS

TECHNICAL FIELD

This disclosure relates to extending living quarters.

BACKGROUND

Living quarters have a limited amount of space to contain furniture. However, furniture can take up substantial space even when not in use. In addition, many rooms are designed include unused vertical space as well.

SUMMARY

In some implementations, a modular furniture cabinet includes a top flooring affixed to static furniture and supported by one or more structures. The top surface of a bottom flooring, backs of the static furniture pieces, and a bottom surface of the top flooring define a storage space, and the dynamic furniture pieces substantially reside in the storage space when the modular furniture cabinet is in a closed configuration.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
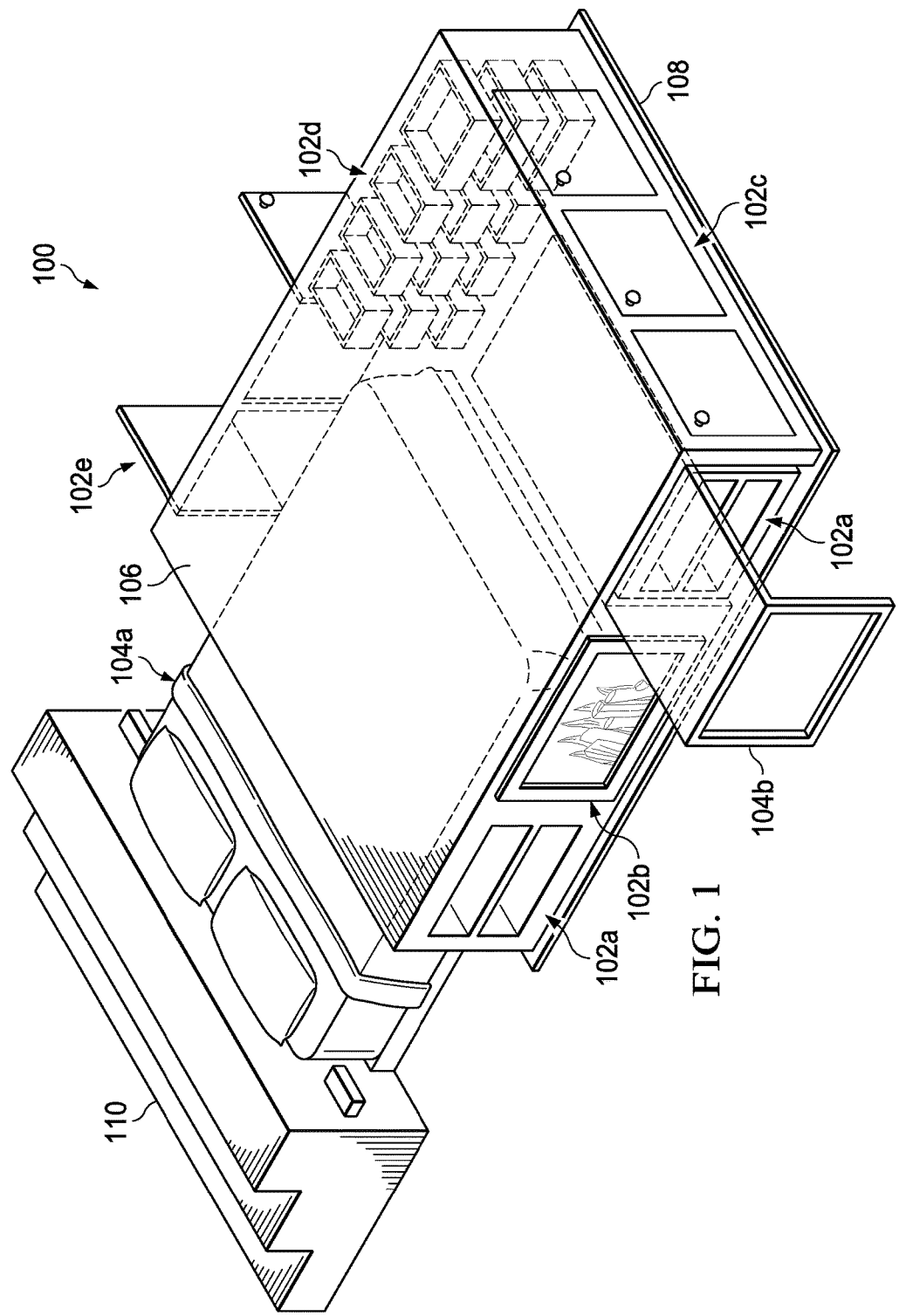
FIG. 1 is an example modular furniture cabinet in accordance with some implementations of the present disclosure.

The present disclosure is directed to a modular cabinet structure 100 for extending the living quarters. For example, the modular cabinet structure 100 may incorporate a plurality of static furniture pieces 102a-e that are built into the frame of the modular cabinet structure 100 and a plurality of dynamic furniture pieces 104a-b that include at least a portion that slide in and out of the modular cabinet structure 100. As illustrated, the plurality of static furniture pieces 102a-e includes a shelves 102a, an electric fireplace 102b, storage cabinets 102c, chest of drawers 102d, and a cabinet 102e. Other modular cabinet structures 100 can all, some, or none of the illustrated static furniture pieces 102a-e without departing from the scope of the disclosure. The plurality of static furniture 102a-e is between and affixed to an upper flooring 106 and a bottom flooring 108 using one or more fasteners. The fasteners can include screws, nails, rivets, adhesives, or other fasteners without departing from the scope of the disclosure. In regards to the arrangement, each of the static furniture pieces 102-a-e can include a top surface that abuts a bottom surface of the upper flooring 106 and include a bottom surface that abuts a top surface of the bottom flooring 108. The modular cabinet structure 100 may include other elements between the surfaces without departing from the scope of the disclosure. A portion of the bottom surface of the upper flooring 106, a portion of the back surfaces of the plurality of static furniture pieces 102a-e and the plurality of dynamic furniture pieces 102a-b, and a portion of the top surface of the bottom flooring define a storage space. As illustrated, the storage space is substantially rectangular and be other shapes without departing from the scope of the disclosure.

The plurality of dynamic furniture pieces 104a-b includes portions that are movable within the storage space. As illustrated, the plurality of dynamic furniture pieces 104a-b includes a bed 104a and a table 104b. The modular cabinet structure 100 can include some, none, or all of the dynamic pieces without departing from the scope of the disclosure. For example, modular cabinet structure 100 can include two beds 104a. Each of the bed 104a and a table top of the table 104b move in a plane parallel to the upper flooring 106 and bottom flooring 108. As a result, the bed 104a and the table top can move in and out of the storage space. When extended out of the storage space, the bed 104a and the table 104b are usable as a bed and a table, respectively. When not in use, the bed 104a and the table 104b are slid into the storage space. When retracted, the upper flooring 106 and remaining portion of the remove define a same square footage defined by that room without any furniture. By using the vertical space previously unused, the modular cabinet structure 100 maintains the usable square footage when the dynamic furniture pieces 104a-b are stored. The modular cabinet structure 100 can include tracks, rails, or elements that guide the bed 104a and the table 104b in and out of the storage space. The dynamic furniture pieces 104a-b can move differently relative to the modular cabinet structure 100. For example, the bed 104a may be attached on hinge connected to the bottom flooring 108 and rotate away from the module furniture piece 100 about the hinge. To access the top flooring 106, stairs 110 can be added. In some implementations, the stairs 110 can be affixed to a headboard of the bed 104a. Supports may be added to the module furniture piece 100 to increase its ability to bear weight and provide additional floor space.

Figure 2:
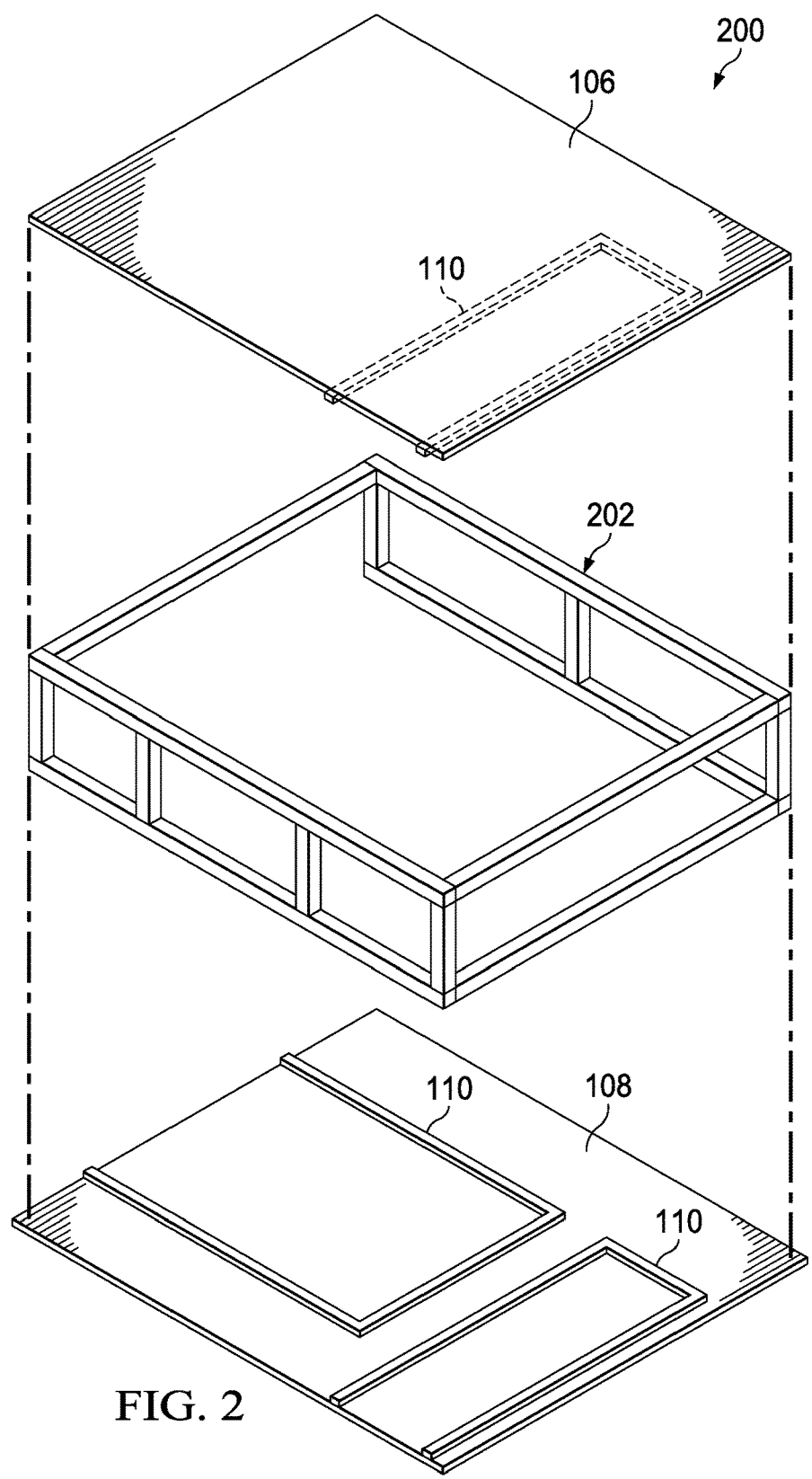
FIG. 2 is an example support structure for the example modular furniture cabinet.

FIG. 2 is an expanded view 200 of the modular furniture cabinet 100. The expanded view 200 illustrates an example support structure 202 for the modular furniture cabinet 100. In this implementation, the support structure 202 includes horizontal and vertical beams that support the top flooring 106. Other support-structure designs can be used without departing from the scope of the disclosure.

Figure 3:
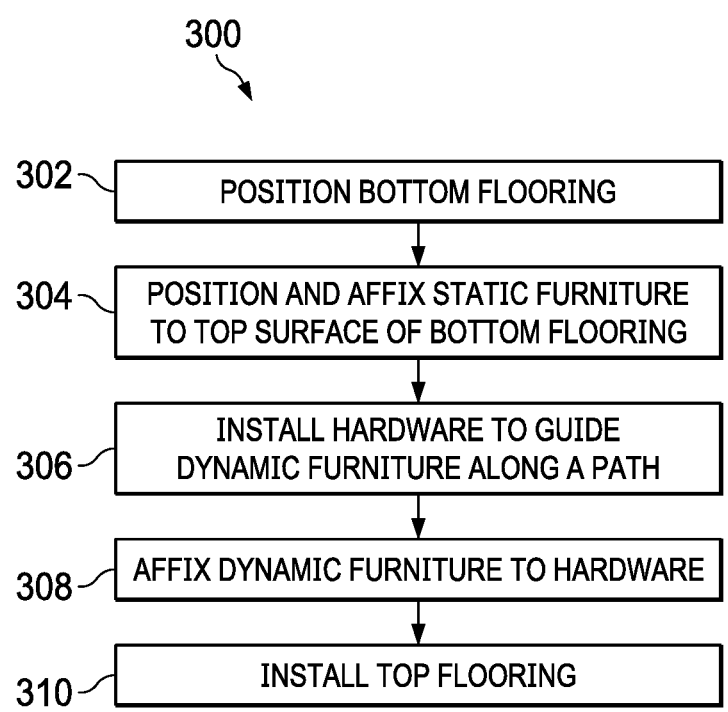
FIG. 3 is a flowchart illustrating an example method for constructing a modular furniture cabinet.

FIG. 3 is a flowchart illustrating an example method 300 for assembling a modular cabinet structure. The method 300 begins at step 302 where bottom flooring is positioned. For example, the bottom flooring 108 in FIG. 1 can be position in a corner, abutting a side, or in the center of a room. At step 304, static furniture is position and affixed to the bottom flooring. In the example, static furniture pieces 102 can include a sufficient number of pieces to support the top flooring 106. For example, a static furniture piece may position at or near each corner of the bottom flooring 106. Next, at step 306, hardware is installed that guides the dynamic furniture pieces 104 along a path when moving them in out of the storage space. The hardware can include rails, tracks, hinges, or other hardware. At step 308, the dynamic furniture is affixed to the installed hardware. Top flooring is installed at step 310. Returning to the example, the top flooring 106 can be affixed to the static furniture 102.

A number of embodiments of the invention have been described. Nevertheless, it will be understood that various modifications may be made without departing from the spirit and scope of the invention. Accordingly, other embodiments are within the scope of the following claims.

What is claimed is:

1. A modular cabinet structure, comprising:
bottom flooring that is substantially planar;
static furniture pieces affixed to the bottom flooring at least proximate a periphery of the bottom flooring and having a bottom surface adjacent a top surface of the bottom flooring;
hardware affixed to the modular cabinet structure and configure to guide attachments along a path;
dynamic furniture pieces affixed to the hardware;
top flooring affixed to the static furniture, wherein the top surface of the bottom flooring, backs of the static furniture pieces, and a bottom surface of the top flooring define a storage space and the dynamic furniture pieces substantially reside in the storage space when the modular cabinet is in a closed configuration; and
the top flooring having a top surface providing access to a space above the modular cabinet structure such that the total square footage of the space is not decreased significantly by the modular cabinet structure.

2. The modular cabinet structure of claim 1, wherein the bottom flooring and the top flooring are substantially rectangular.

3. The modular cabinet structure of claim 1, wherein the static furniture pieces comprise at least one of a shelf, an electric fireplace, a cabinet, or a drawer.

4. The modular cabinet structure of claim 1, wherein the dynamic furniture pieces comprise at least one of a bed or a table and are configured slide horizontally along the path.

5. The modular cabinet structure of claim 1, further comprising stairs configured to grant access to the top flooring.

6. The modular cabinet structure of claim 1, wherein sides of modular cabinet structure and configured to enable interchangeability of static furniture pieces.

* * * * *